United States Patent [19]

Kuzma

[11] 4,328,148

[45] May 4, 1982

[54] COMPOSITIONS COMPRISING WATER AND HYDROPHILIC POLYMERS AND CONTACT LENSES THEREFROM

[76] Inventor: Petr Kuzma, 1708 Westminster Blvd., Parlin, N.J. 08859

[21] Appl. No.: 216,434

[22] Filed: Dec. 15, 1980

Related U.S. Application Data

[62] Division of Ser. No. 61,466, Jul. 29, 1979, Pat. No. 4,275,183.

[51] Int. Cl.$^3$ .............................................. C08L 33/14
[52] U.S. Cl. .................................. 524/555; 523/106; 523/113; 524/813
[58] Field of Search .............................. 260/29.6 TA

[56] References Cited

U.S. PATENT DOCUMENTS

| | | | |
|---|---|---|---|
| 3,965,063 | 6/1976 | Holcombe | 260/29.6 TA |
| 3,985,697 | 10/1976 | Urbach | 260/29.6 TA |
| 4,022,754 | 5/1977 | Gordon et al. | 260/29.6 TA |
| 4,056,496 | 11/1977 | Mancini et al. | 260/29.6 TA |
| 4,113,686 | 9/1978 | Holcombe | 260/29.6 TA |
| 4,123,407 | 10/1978 | Gordon | 260/29.6 TA |
| 4,123,408 | 10/1978 | Gordon | 260/29.6 TA |
| 4,180,308 | 12/1979 | Mancini et al. | 260/29.6 TA |

*Primary Examiner*—Harry Wong, Jr.
*Attorney, Agent, or Firm*—Cushman, Darby & Cushman

[57] ABSTRACT

There is a prepared a hydrophilic water swellable, water insoluble copolymer of (1) at least 35% of a hydroxy ($C_2$–$C_4$-alkyl)-2-alkenoate, (2) 30 to 60% of a 2-alkenamide or an N, N-di ($C_1$–$C_6$-alkyl)2-alkenamide, (3) 5 to 20% of R $+OR_1+_xZ$ where R is $C_1$–$C_6$ alkyl, $R_1$ is $C_2$–$C_4$ alkylene, x is an integer of 1 to 4 and Z is 2-alkenoyloxy and (4) 0.3 to 5% of a polyethylenically unsaturated crosslinking agent having a relatively long aliphatic chain, the copolymer being capable of holding 50 to 80 weight % of water. The polymers are particularly useful in preparing hydrophilic contact lenses of high burst strength and extended wear properties.

5 Claims, No Drawings

COMPOSITIONS COMPRISING WATER AND HYDROPHILIC POLYMERS AND CONTACT LENSES THEREFROM

This is a division of application Ser. No. 61,466 filed July 29, 1979 and now U.S. Pat. No. 4,275,183.

BACKGROUND OF THE INVENTION

The present invention relates to novel hydrophilic copolymers and soft contact lenses made therefrom.

A hydrophilic polymer suitable for use as an extended wear soft contact lens must have high oxygen permeability and good mechanical strength.

The characteristics of an extended wear contact lens include the following:

1. Tolerance of the eye to a foreign body such as a contact lens:

Tolerance of a soft lens by the ocular environment is affected by water content, shape, or geometry, thickness and edge quality. The surface of the lens should be smooth in order not to affect the normal precorneal tear film and the superficial epithelial layer. Such a smooth surface should not be affected by temperature, pH, tonicity and foreign body deposition, mucous adhesion, lipids of the tears or abrasion by the lids. Wettability of the lens surface is important in order to allow tears to fill the lens-corneal interspace. The lens should also be physiologically inert.

2. Maintenance of a physiological norm with such a lens in place:

Proper oxygenation is essential for the aerobic cycle of metabolism of the cornea. It has been clinically established that the minimum corneal requirement of oxygen is 3.5 $\mu$l (STP)/cm$^2$hr. Oxygen permeability of the lens will depend on the type of material (chemical composition), water content and thickness. Basically, it is agreed that the oxygen prerequisite of the cornea could be met by a lens with about 60% water content and less than 0.2 mm thick.

Some constant wear patients go through a phase of morning corneal edema which clears after waking. These symptoms are slight and in some cases disappear after a few weeks of wearing.

In view of the corneal metabolism, the chemical and physical properties of the lens are very important. The hydrophilic lens should not selectively absorb by-products of metabolism, toxins and enzymes, concentration of which might eventually lead to tissue damage.

3. Good optical properties:

The material of the lens should be optically clear with refractive index close to 1.43 (refractive index of tears), and should be chemically and physically stable in order to retain its optical qualities.

Practically all, if not all, commercially available soft contact lenses that could be considered for extended wear incorporate HEMA (2-hydroxyethyl methacrylate) in compositions with other monomers of high hydrophilicity, methacrylic acid and N-vinylpyrrolidone, or are made of silicone rubber.

The group of lenses using highly hydrophilic monomers face several important problems. Mechanical strength of these high water content copolymers is inferior and the lens in order to withstand handling has to be made thick. Since oxygen permeability is directly related to membrane thickness, the advantage of high water content is cancelled out by the thickness.

Deposits on lenses are also a great drawback to continuous wear. Therefore, methacrylic acid, which has a negatively charged carboxyl group on the molecule, will attract oppositely charged particles contributing to lens contamination.

Another widely used material to improve hydrophilicity is N-vinylpyrrolidone. Tensile strength of these copolymers is again very low and moreover N-vinylpyrrolidone decreases heat stability of the system. Lenses with high N-vinylpyrrolidone content cannot be sterilized by autoclaving without permanent damage and discolorization.

Silicon has a superior oxygen permeability to the hydrogels due to the flexibility of the Si-O bond. Silicon rubber, however, is strongly hydrophobic and therefore quite irritating for the lens wearer. The second major problem is the ability of silicones to absorb lipophilic substances.

An object of the present invention is to provide a hydrogel lens which would combine the following properties:

Water content: approximately 60%
Burst Strength/0.1 mm (wet): comparable to commercial Hydron ® lenses (made from polyHEMA
Total Extractables: 10% maximum
Oxygen Permeability: at least twice better than polyHEMA
Good optical properties
Ability to withstand autoclaving
Ability to withstand routine cleaning and disinfection regimen

SUMMARY OF THE INVENTION

It has now been found that this object and other objects of the invention can be obtained by the preparation of a novel water-swellable, water-insoluble copolymer and the manufacture of a soft hydrophilic contact lens therefrom.

The novel copolymer is prepared via a vinyl polymerization process which involves the polymerization of monomers comprised of at least one monomer from each of the following four monomeric subclasses:

(1) at least 35% hydroxy($C_2$–$C_4$alkyl) 2-alkenoate,
(2) 30 to 60% of a 2-alkenamide e.g. N,N-di($C_1$–$C_6$alkyl) acrylamide or methacrylamide, or a N,N-di($C_1$–$C_6$alkyl) 2-alkenamide,
(3) 5 to 20% R—$(OR_1)_{\overline{x}}$Z where R is $C_1$–$C_6$alkyl, $R_1$ is $C_2$–$C_4$alkylene, x is an integer from 1 to 4, and Z is 2-alkenoyloxy, e.g. acryloyloxy or methacryloyloxy,
(4) 0.3 to 5% of a polyethylenically unsaturated cross-linking agent having a relatively long aliphatic chain.

The novel copolymers, as stated, possess extended wear characteristics. The polymers, in equilibrium with water, are optically clear, chemically and physically stable, possess a refractive index of approximately 1.43, e.g. 1.30 to 1.56, and exhibit a water gain of 58 to 80 weight percent, preferably 60 to 75 weight percent, based on the total weight of water plus dry polymer. Additionally, the oxygen permeability of the novel tetrapolymers is at least twice the oxygen permeability of the commercial polymacon soft lenses, e.g., SOFLENS ® and HYDRON ® soft lens. The burst strength value is at least 7 psi and can be as much as 8 psi, or more, per 0.1 mm of wet center thickness of contact lens.

As the hydroxy($C_2$–$C_4$alkyl) 2-alkenoate monomer there can be used, for example, 2-hydroxyethyl methacrylate, the hydroxypropyl methacrylates, triethylene glycol monomethacrylate, the hydroxybutyl methacrylates, 2-hydroxyethyl acrylate, the hydroxypropyl acrylates, the hydroxybutyl acrylates, 2-hydroxyethyl crotonate, and hydroxypropyl crotonate. Preferably there is employed a hydroxyalkyl acrylate or methacrylate, more preferably hydroxyethyl acrylate or methacrylate, most preferably 2-hydroxyethyl methacrylate (HEMA).

As the 2-alkenamide monomer, there can be used, for example, acrylamide, methacrylamide, N-methylmethacrylamide, N,N-dimethylacrylamide, N,N-dimethylmethacrylamide, N,N-diethylacrylamide, N,N-diethylmethacrylamide, N,N-dipropylacrylamide, N,N-dipropylmethacrylamide, N,N-dibutylacrylamide, N,N-dibutylmethacrylamide, N,N-methylethylacrylamide, N,N-dimethylcrotonamide, N-methyl-N-hexylmethacrylamide, and crotonamide. Preferably the N-alkyl groups have 1 to 2 carbon atoms, more preferably 1 carbon atom. The most preferred alkenamide is N,N-dimethylacrylamide. The alkenamide increases the hydrophilicity of the novel copolymer.

As the monomer characterized by the formula $R-(OR_1)_x Z$ there can be used, for example, methoxytriethylene glycol methacrylate, methoxytripropylene glycol methacrylate, methoxytetraethylene glycol acrylate, methoxytetraethylene glycol methacrylate, methoxytetrapropylene glycol methacrylate, ethoxytriethylene glycol acrylate, ethoxytriethylene glycol methacrylate, ethoxytetraethylene glycol methacrylate, propoxytriethylene glycol acrylate, propoxytriethylene glycol methacrylate, butoxytriethylene glycol methacrylate, butoxytetraethylene glycol methacrylate, butoxytripropylene glycol methacrylate, amyloxytriethylene glycol methacrylate, hexoxytriethylene glycol methacrylate, hexoxytetraethylene glycol methacrylate, methoxytriethylene glycol crotonate, and methoxytetraethylene glycol crotonate. Preferably the monomer is an acrylate or methacrylate. The alkyl group is preferably $C_1$ to $C_4$, most preferably $C_1$ to $C_2$. Preferably x is 1. The most preferred compound is ethoxyethyl methacrylate. The alkoxy containing compound improves the mechanical strength and oxygen permeability of the novel copolymer. However, amounts of this compound which adversely alter the desired hydrophilicity characteristic should be avoided.

The polyethylenically unsaturated cross-linking agent is preferably a polyalkylene glycol ester of a 2-alkenoic acid. Thus there can be employed polyalkylene glycol diacrylate, dimethacrylate, and dicrotonate oligomers which contain from 3 to 10, preferably 3 to 4, alkylene glycol moieties, i.e., $-(RO)-$. Thus there can be employed triethylene glycol diacrylate, triethylene glycol dimethacrylate, triethylene glycol dicrotonate, tetraethylene glycol dimethacrylate, tetraethylene glycol dicrotonate, hexaethylene glycol diacrylate, hexaethylene glycol dimethacrylate, heptaethylene glycol dimethacrylate, tripropylene glycol diacrylate, tripropylene glycol dimethacrylate, tetrapropylene glycol dimethacrylate, decapropylene glycol dimethacrylate, tributylene glycol diacrylate, tributylene glycol dimethacrylate, and tetrabutylene glycol dimethacrylate. Such compounds have the formula

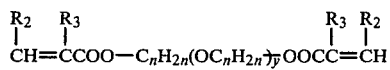

where each $R_2$ and $R_3$, individually, are hydrogen or lower alkyl, e.g., methyl or ethyl, n is an integer of 2 to 4 and y is an integer of 2 to 9. There can also be employed other diesters with relatively long aliphatic chains such as those having a chain of 6 to 10 aliphatic carbon atoms such as hexamethylene glycol diacrylate, hexamethylene glycol dimethacrylate, octamethylene glycol dimethacrylate, decamethylene glycol diacrylate, and decamethylene glycol dimethacrylate. The preferred polyethylenically unsaturated compounds are triethylene glycol diacrylate and dimethacrylate, and tetraethylene glycol diacrylate and dimethacrylate. The most preferred compound is tetraethylene glycol dimethacrylate.

It will be observed that the most commonly employed cross-linking agent for polyHEMA hydrogels, namely ethylene glycol dimethacrylate is not employed. However, there is not excluded from the present specification and claims the small amount of ethylene glycol dimethacrylate normally present as an impurity in lens grade hydroxyethyl methacrylate. Similarly there is not excluded the small amount of ethylene glycol diacrylate normally present as an impurity in lens grade hydroxyethyl acrylate. Small amounts of other typical cross-linking agents, in addition to the polyalkylene glycol diester, may be included in the polymerization process.

Polymerization can be carried out under conventional conditions. Thus, for example, polymerization can be carried out at 20° to 105° C., frequently 35° to 40° C. to 95° C. The polymerization can be carried out employing a catalytically significant quantity of a free radical catalyst, e.g., from 0.05 to 1 percent based on the total weight of polymerizable monomers. Typical catalysts include t-butyl peroctoate, benzoyl peroxide, isopropyl percarbonate, 2,4-dichlorobenzoyl peroxide, methyl ethyl ketone peroxide, cumene hydroperoxide, and dicumyl peroxide. Irradiation, e.g., by ultraviolet light or gamma rays, can also be employed to catalyze the polymerization reaction. Polymerization can also be carried out in conventional manner as shown in U.S. Pat. Nos. 2,976,576; 3,220,960; 3,361,858; 3,699,089; 3,577,518; 3,641,237; 3,761,286; 3,691,263; and 3,496,254. Additional polymerization catalysts include bis(t-butyl cyclohexyl) peroxy dicarbonte (available commercially as Percadox 16), t-butyl peroxypivalate laurol peroxide, and 2,2'-azobis (isobutyronitrile).

Of the initiators tried the most effective were found to be Percadox 16 in the high temperature curing process and isopropyl percarbonide (IPP) in the low temperature curing process.

Polymerization can be carried out in solution in organic solvent, in water, in solvent/water mixtures, or in bulk. The presently preferred procedure for polymerization to make optical buttons is bulk polymerization.

While not essential, as a precaution against premature polymerization in formulae employing Percadox 16, the hydroxyalkyl alkenoate and cross-linker were mixed at room temperature with the Percadox 16 until all the Percadox 16 dissolved therein. Then the remaining monomers were added and the resulting admixture stirred. This step was conducted in a water-ice bath. Nitrogen purging was carried out under the same conditions for approximmately 30 minutes. Total value of the monomer mixture in most experiments was 10 ml. The curing procedure was as follows:
1. Low temperature curing for IPP compositions: 22 hours at 40° C. followed with two hours postcuring at 80° C., 2. High temperature curing for Percadox 16 initiated compositions: 2 hours are 95° C.

Polymerizations were carried out in polypropylene lens molds and polypropylene parallel plates.

The increase in oxygen permeability (O.P.) characteristic of the novel copolymers is attained without the sacrifice of the mechanical properties of conventional commercial soft contact lenses made from polyHEMA. Contact lenses made from the novel copolymers, as stated previously, can remain in contact with the eye of the wearer for longer periods of time than heretofore obtainable with commercial contact lenses due to the high O.P. characteristic. This O.P. characteristic is completely unpredictable from the prior art.

Contact lenses made from the novel copolymers also have good optical properties, hydrolytic stability, and non-biodegradability.

The novel contact lenses can be made by any of the conventional methods, e.g., by molding, machining or spin casting. Thus, there can be used the procedures disclosed in any of the following U.S. Pat. Nos. 3,361,858; 3,408,429; 3,476,499; 3,488,111; 3,498,254; 3,499,862; 3,542,907; 3,557,261; 3,660,545; 3,691,263; 3,699,089; and While the novel copolymers are preferably employed to prepare novel contact lenses they can also be employed for any of the other uses for which water-swellable, water-insoluble hydrophilic polymers can be used. Thus, they can be used to make novel dialyzer diaphragms, to prepare novel artificial kidneys and other novel implants and novel prosthetic devices and the other uses disclosed in U.S. Pat. Nos. 2,976,576 and 3,220,960. They can be used to make novel fragrance releasing flowers and other novel articles in U.S. Pat. No. 3,400,890. They can be used in preparing novel thereapeutic containing bandages as disclosed in U.S. Pat. No. 3,428,043. They can be used as novel tobacco smoke filters as disclosed in U.S. Pat. No. 3,470,883. They can be used as novel non-fog coatings on windows, ski goggles, sunglasses, camera lenses, microscope lenses, binoculars, telescope lenses, mirrors, drinking glasses, gun sights, meat and other food wrappers and other uses disclosed in U.S. Pat. No. 3,488,215 and U.S. Pat. No. 3,515,579. They can be used to releasably entrap medicines, flavors, essences, fragrances, spices, food colors, sweeteners and dyes, medical surgical devices, e.g., heart valves, vessel substitutes, intrauterine devices, membranes and other films, dialyzer diaphragms, catheters, mouth guards, denture liners, boat coatings, tooth brush bristles, nutrient media holders, antiseptic containing bandages, to encapsulate hormones, suture theads and coatings for cotton suture threads, chewing gum additive, toothpaste and all of the other uses disclosed in U.S. Pat. Nos. 3,520,949 and 3,618,231. They can be used as novel carriers for all of the drugs and having all of the forms, e.g. as gauze dressings, spongy hydrogels, drug implant tablets disclosed in U.S. Pat. No. 3,551,556. They can be used to modify collagen to make blood vessels, urinary bladders and all of the other uses disclosed in U.S. Pat. No. 3,563,925. They can be used to make novel catheters as disclosed in U.S. Pat. No. 3,566,874. They can be used to apply an essence, cleansing, sanitizing or deodorizing agent to composite fibers and for all the other uses disclosed in U.S. Pat. No. 3,567,118. They can be used in novel cosmetic compositions, e.g., to treat hair and for all the other uses disclosed in U.S. Pat. No. 3,574,822 for water insoluble products. They can be used to absorb and thereby stabilize vitamins such as ascorbic acid, nicotinamide, calciferol and for all the other uses disclosed in U.S. Pat. No. 3,574,826. They can be used to coat boats and other marine structures with or without having an antifoulant releasably entrapped in the coating and for all the other uses disclosed in U.S. Pat. No. 3,575,123. They can be used to prepare sustained release tablets containing penicillin or other drugs and for all of the uses disclosed in U.S. Pat. No. 3,577,512. They can be used in thin layer chromatography and for all of the other uses disclosed in U.S. Pat. No. 3,583,957. They can be used as semipermeable sheets for dialysis, artificial dentures and all of the other uses disclosed in U.S. Pat. No. 3,607,848. They can be used to replace gelatin in whole or in part in light-sensitive photographic layers on films, paper and other substrates and all of the other uses disclosed in U.S. Pat. No. 3,620,751. They can be used to entrap drugs for gradual release after oral ingestion and for all of the other uses disclosed in U.S. Pat. No. 3,689,634. They can be used to improve mascara pigment and for all of the other uses disclosed in U.S. Pat. No. 3,697,643. They can be used as sorbents for telomic plants and algae with or without active filters, e.g., silica gel or activated carbon and for all of the other uses disclosed in U.S. Pat. No. 3,725,291. They can be used to entrap enzymes and microorganisms and for all of the other uses disclosed in U.S. Pat. No. 3,769,790. They can be used to prepare a moisture-vapor permeable pressure-sensitive covering and for all of the other uses disclosed in U.S. Pat. No. 3,645,835.

It is emphasized, however, that their unexpected properties are primarily useful as making high water content soft contact lens.

Because of their high oxygen permeability lenses from the novel copolymer can have a wet center thickness of as much as 5 mm athough they normally have a wet center thickness of 2 mm or less, e.g., 1 mm.

Unless otherwise indicated all parts and percentages are by weight. The compositions can consist essentially of or consist of the materials set forth.

The presently preferred formulation for making soft contact lenses according to the invention are the compositions of Example 1. In addition to making lenses there of course can be made lens blanks and buttons.

EXAMPLE 1

A cast contact lens was prepared from the following formulation

| Hydroxyethyl methacrylate | 49.0% |
|---|---|
| N,N-dimethylacrylamide | 39.2% |
| Ethoxyethyl methacrylate | 9.8% |
| Tetraethylene glycol dimethacrylate | 2.0% |

The above monomer mixture was polymerized in the presence of 0.5% Percadox 16.

| Polymerization conditions: | Temp. 95° C. |
|---|---|
| | Time 2 hours |

PROPERTIES OF THE CAST LENSES FORMED

Water content: 62% (saline)
Linear Expansion: 37.7%
Burst Strength: 7 psi/0.1 mm of wet center thickness
Extractables: 8.1%

Autoclaving: no visible change
Oxygen Permeability: $25 \times 10^{-10}$ cm$^2$/sec cm Hg with lens composition having a thickness of 0.217 mm. The oxygen permeability of polyHEMA is about $12 \times 10^{-10}$ cm$^2$/sec cm Hg
Light Transmission: 99.3% at $\lambda = 660$ nm
Refractive Index: 1.334

EXAMPLE 2

When N,N-dimethylmethacrylamide and triethylene glycol dimethacrylate are used in lieu of N,N-dimethylacrylamide and tetraethylene glycol dimethacrylate, respectively, comparable results are obtained.

EXAMPLE 3

When 2-hydroxypropyl methacrylate is used in lieu of 2-hydroxyethyl methacrylate, comparable results are obtained.

The linear expansion and oxygen permeability tests were carried out on films on the tetrapolymer. The remaining tests were carried out on contact lenses.

WATER CONTENT

This is a destructive test involving hydration of the lens to determine the wet weight and subsequently drying the lens in the oven to obtain dry weight. Water content (or saline content) is expressed as percent weight of water contained in a hydrogel on a wet basis.

$$\% \ H_2O = \frac{(W_{wet} - W_{dry})}{W_{wet}} \times 100$$

BURST STRENGTH

Burst strength is measured on an apparatus which determines the pressure at which the hydrated lens bursts. In order to compare lenses of different thicknesses, experimental values of bursting pressure were recalculated for a standard wet center thickness of 0.1 mm.

% EXTRACTABLES

The level of extractables was calculated from weight loss after exhaustive leaching.

% CONVERSION

Water extract from extractables determination is used to analyze the residual monomer content by Gas Chromatography or UV-absorption methods.

REFRACTIVE INDEX

This property was measured using a B & L Abbe Refractometer.

AUTOCLAVING

Ability to withstand autoclaving without altering physical and chemical properties of the lens is an important requirement. Lenses were autoclaved at 121° C. and 15 psi for 60 minutes.

LINEAR EXPANSION

Linear expansion involves a comparison of dimensions of an abscissa plotted on the surface of a polymer film in the dry and hydrated state. Measurements of linear expansion were made under the microscope using thin films of polymers. Molds for casting of such films were designed to duplicate curing conditions of lens samples in polypropylene molds. This was to ensure that essential parameters such as curing exotherm and conversion are identical for films and lenses.

Calculation of linear expansion is based on dry dimensions according to the following formula:

$$\% \ LE = \frac{L_w - L_d}{L_d} \times 100$$

$L_w =$ hydrated dimension
$L_d =$ dry dimension

Basically, the oxygen permeability coefficient Pd of a lens material is obtained from a steady state measurements of dissolved oxygen flux through a hydrophilic membrane. Concentrations on either side of the membrane are different and constant under steady state conditions and are measured by oxygen sensing electrode.

Oxygen flux value due to diffusion is determined from measurements of a flow rate of oxygen free water, area of the membrane and solubility of oxygen in water. Under these conditions the following equation can be written:

$$\text{Flux} = \frac{S_w \times P_2 \times f}{A}$$

Also:

$$\text{Flux} = \frac{Pd \ P_1 - P_2}{l}.$$

And therefore $$Pd = \frac{P_1 - P_2}{\text{Flux} \cdot l}$$

Where:
$S_w =$ solubility of oxygen in water
$f =$ flow rate of oxygen free water
$A =$ area of membrane
$Pd =$ oxygen permeability coefficient
$P_1 - P_2 =$ difference in oxygen concentrations on either side of membrane
$l =$ thickness Particularly preferred novel hydrophilic contact lenses are characterized by a water content of 60 to 62%, linear expansion of 37 to 38, burst strength of at least 7 psi/0.1 mm of wet center thickness, extractables below about 10%, no visible change on autoclaving (under conditions comparable to those employed with respect to polymacon soft lenses), oxygen permeability of at least about twice the oxygen permeability of polymacon soft lens, e.g., at least about $24 \times 10^{-10}$ cm$^2$/sec cm Hg, light transmission of at least 99% at $\lambda = 660$ nm, and a refractive index of 1.43.

What is claimed is:
1. A composition containing water and a hydrophilic water swellable, water insoluble copolyme of at least one monomer from each of the following four subclasses:
  (1) at least 35% hydroxy (C$_2$–C$_4$ alkyl) acrylate, methacrylate or crotonate,
  (2) 30 to 60% of acrylamide, methacrylamide, or crotonamide or N,N-di(C$_1$–C$_6$-alkyl) acrylamide, methacrylamide or crotonamide,
  (3) 5 to 20% R $(OR_1)_x$Z wherein R is C$_1$–C$_6$ alkyl, wherein R$_1$ is C$_2$–C$_4$ alkylene, wherein x is an inte- ger from 1 to 4 and wherein Z is acryloyloxy, methacrylolyloxy or crotonoyloxy, (4) 0.3 to 5% of a polyethylenically unsaturated crosslinking agent having the formula

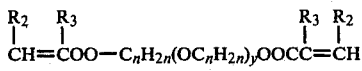

where $R_2$ and $R_3$ are hydrogen or lower alkyl, n is an integer of 2 to 4 and y is an integer of 2 to 9, said copolymer containing 58 to 80 weight % of water based on the total of water plus dry polymer.

2. A composition containing water and a hydrophilic water swellable, water insoluble copolymer of at least one monomer from each of the following four subclasses:
(1) at least 35% hydroxy ($C_2$–$C_4$ alkyl) acrylate or methacrylate,
(2) 30 to 60% of acrylamide or methacrylamide, or N,N-di($C_1$–$C_6$-alkyl) acrylamide or methacrylamide,
(3) 5 to 20% R$-(OR_1-)_x$Z wherein R is $C_1$–$C_6$ alkyl, wherein $R_1$ is $C_2$–$C_4$ alkylene, wherein x is an integer from 1 to 4 and wherein Z is acryloyloxy or methacrylolyloxy, (4) 0.3 to 5% of a polyethylenically unsaturated crosslinking agent having the formula

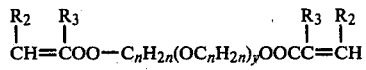

where $R_2$ and $R_3$ are hydrogen or lower alkyl, n is an integer of 2 and 4 and y is an integer of 2 and 9, said copolymer containing 58 to 80 weight % of water based on the total of water plus dry polymer.

3. A composition containing water and a copolymer according to claim 2:
wherein (1) is hydroxyethyl methacrylate,
wherein (2) is N,N-dimethylacrylamide,
wherein (3) is ethoxyethyl methacrylate, and
wherein (4) is tetraethylene glycol dimethacrylate.

4. A composition according to claim 3 exhibiting a water content of 60 to 75 weight percent.

5. A composition according to claim 4 having a water content of approximately 60%.

* * * * *